United States Patent
Hirose et al.

(10) Patent No.: US 10,431,394 B2
(45) Date of Patent: Oct. 1, 2019

(54) CAPACITOR

(71) Applicant: Panasonic Intellectual Property Management Co., Ltd., Osaka (JP)

(72) Inventors: Eri Hirose, Kyoto (JP); Mitsuhiro Fujita, Osaka (JP); Hiroyuki Yanagisawa, Shiga (JP); Yasuyuki Ito, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/381,844

(22) Filed: Dec. 16, 2016

(65) Prior Publication Data

US 2017/0148580 A1 May 25, 2017

Related U.S. Application Data

(63) Continuation of application No. PCT/JP2015/003434, filed on Jul. 8, 2015.

(30) Foreign Application Priority Data

Jul. 10, 2014 (JP) .................................. 2014-142325

(51) Int. Cl.
*H01G 11/32* (2013.01)
*H01G 11/24* (2013.01)

(52) U.S. Cl.
CPC .............. *H01G 11/32* (2013.01); *H01G 11/24* (2013.01); *Y02E 60/13* (2013.01)

(58) Field of Classification Search
CPC ................................. H01G 11/32; H01G 11/24

USPC ......................................................... 361/502
See application file for complete search history.

(56) References Cited

U.S. PATENT DOCUMENTS

| | | | | |
|---|---|---|---|---|
| 2013/0027845 A1* | 1/2013 | Fujii | ...................... | H01G 11/34 361/502 |
| 2015/0287547 A1* | 10/2015 | Okuno | ................... | H01G 11/24 361/502 |
| 2016/0311690 A1* | 10/2016 | Dai | ........................ | C01B 31/12 |
| 2017/0209848 A1* | 7/2017 | Takenaka | .............. | C07C 17/389 |

FOREIGN PATENT DOCUMENTS

| JP | 4401192 B | 1/2010 |
|---|---|---|
| JP | 2011-020907 | 2/2011 |

OTHER PUBLICATIONS

International Search Report of PCT application No. PCT/JP2015/003434 dated Sep. 29, 2015.

* cited by examiner

*Primary Examiner* — Michael P McFadden
(74) *Attorney, Agent, or Firm* — McDermott Will & Emery LLP

(57) ABSTRACT

An object of the present invention is to provide a capacitor excellent in reliability, of which charge-discharge characteristics are hardly deteriorated. The capacitor of the present invention includes: a capacitor element including a positive electrode and a negative electrode; and a case that stores the capacitor element together with an electrolytic solution, wherein at least one of the positive electrode and the negative electrode contains activated carbon, and a sum of volumes per unit weight of pores having a pore diameter of from 30 Å to 100 Å inclusive among pores of the activated carbon is 0.2 cm$^3$/g or more.

11 Claims, 2 Drawing Sheets

CAPACITOR

TECHNICAL FIELD

The present invention relates to a capacitor to be used in various kinds of electronic devices, electric devices, industrial devices and automobiles.

BACKGROUND ART

Electric double layer capacitors being one example of capacitors have been developed as power storage devices for power-assisting and backing up electronic devices. In this situation, as a result of repeatedly conducting studies on activated carbon for capacitors in order to achieve life prolongation by maintaining charge-discharge characteristics, it has been found that this purpose can be achieved by using activated carbon containing a predetermined amount of metal components that have been heretofore removed as impurities.

It is known that activated carbon, which is produced from coal containing 1800 ppm to 5000 ppm of iron and which has an average particle size of 1 μm to 50 μm, a BET specific surface area of 2000 m$^2$/g or more and a pore volume of 1 mL/g or more, and contains 1800 ppm to 5000 ppm of iron, has been heretofore used as activated carbon for capacitors.

As prior art document information related to the present application, for example PTL 1 is known.

CITATION LIST

Patent Literature

PTL 1: Japanese Patent Publication No. 4401192

SUMMARY OF THE INVENTION

An object of a capacitor of the present invention is to provide a capacitor having excellent charge-discharge characteristics and a prolonged life.

Solution to Problem

In a capacitor of the present invention, at least one of a positive electrode and a negative electrode contains activated carbon. A sum of volumes per unit weight of pores having a pore diameter of from 30 Å to 100 Å inclusive among pores of the activated carbon is 0.2 cm$^3$/g or more.

Advantageous Effect of Invention

Owing to the above-mentioned configuration, a capacitor of the present invention is capable of suppressing deterioration of charge-discharge characteristics in repetition of charge-discharge. This may be because activated carbon to be used in the capacitor according to the present invention includes a larger number of regions having a large diameter among pores as compared to conventional activated carbon, so that an electrolytic solution impregnated into the activated carbon, and cations and anions contained in the electrolytic solution can be easily diffused in pores.

DESCRIPTION OF EMBODIMENT

Problems in a conventional capacitor will be described before description of an exemplary embodiment of the present invention.

When activated carbon described in PTL 1 is used in an electrode, certain reliability can be definitely imparted to a capacitor. However, for maintaining excellent charge-discharge characteristics irrespective of a use environment, it has been necessary to conduct further studies on a configuration of an electrode produced using activated carbon.

Thus, the present inventors have conducted extensive studies, and resultantly arrived at an invention as described later by giving attention to pores of activated carbon.

Hereinafter, an example of the present invention will be described with reference to drawings.

Figure 1:
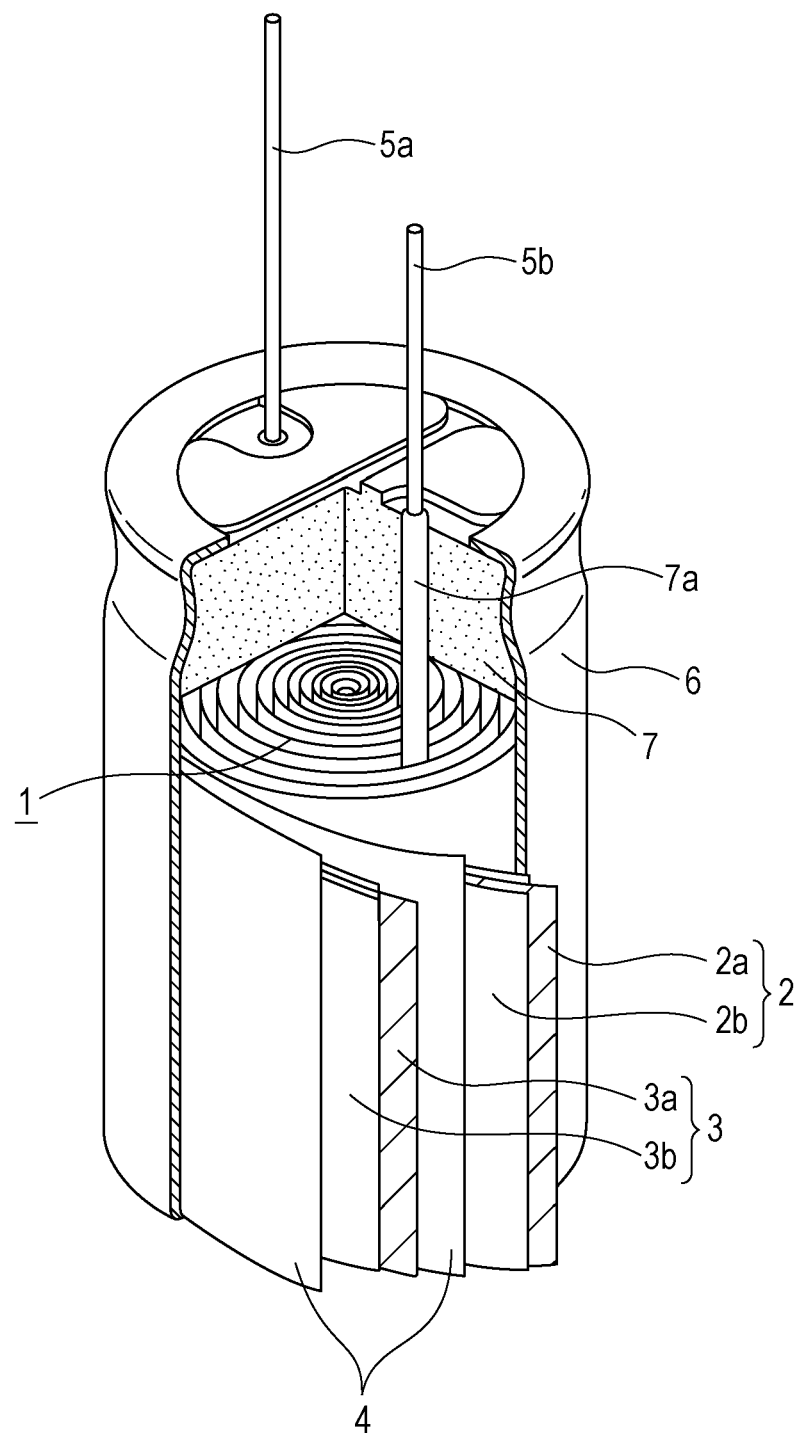
FIG. 1 is a partial cutout perspective view showing a capacitor according to an exemplary embodiment of the present invention.

FIG. 1 is a partial cutout perspective view showing a configuration of a capacitor in this example. In this example, a configuration of an electric double layer capacitor is used as one example of capacitors. In FIG. 1, the electric double layer capacitor in this example includes capacitor element 1, an electrolytic solution (not illustrated) impregnated into capacitor element 1, and outer packaging case 6 storing capacitor element 1 and the electrolytic solution.

Capacitor element 1 includes positive electrode 2, negative electrode 3 facing positive electrode 2, and separator 4 interposed between positive electrode 2 and negative electrode 3. Positive electrode 2, negative electrode 3 and separator 4 are rolled together. Instead of the above-mentioned configuration, these components may be laminated to form capacitor element 1. Positive electrode 2 includes current collector 2a, and electrode layer 2b which is formed on current collector 2a, and is capable of absorbing and desorbing ions. Similarly, negative electrode 3 includes current collector 3a, and electrode layer 3b which is formed on current collector 3a, and is capable of reversibly absorbing and desorbing ions. To positive electrode 2 and negative electrode 3 are connected lead wires 5a and 5b, respectively, as drawing members. Capacitor element 1 and the electrolytic solution are stored in bottomed cylinder-shaped outer packaging case 6, and an opening end part of outer packaging case 6 is sealed by sealing member 7 in such a manner that lead wires 5a and 5b are exposed.

Positive electrode 2 and negative electrode 3 are prepared in the following manner. As current collectors 2a and 3a, for example about 15 μm-thick high-purity aluminum foils (containing 99% or more of Al) are provided, and the aluminum foils are electrolytically etched in a chlorine-based etchant to roughen surfaces of the aluminum foils.

Electrode layers 2b and 3b are then formed, respectively, on the roughened front and back surfaces of current collectors 2a and 3a. Materials that form electrode layer 2b include activated carbon being one example of carbon materials, a binder and a conductive assistant.

As one example of activated carbon being one example of carbon materials that absorb and desorb ions in an electrode part according to the present invention, coconut husk-based having an average particle size of 1 μm to 10 μm is used. However, activated carbon to be used in an electrode for capacitors according to the present invention is not limited thereto, and for example, a carbon material obtained using, as a raw material, wood powder, paper, coal coke, petroleum coke, petroleum pitch, phenol resin, carbon gel prepared using a sol-gel polymerization method, or the like can be used. For example, polytetrafluoroethylene is used as a binder, and carboxymethylcellulose (CMC) etc. is used as a dispersant. As a conductive assistant, for example, carbon black such as acetylene black is used. A paste obtained by mixing the activated carbon, conductive assistant, dispersant and binder at a weight ratio of about 88:5:5:2, respectively, is used. The paste is kneaded by a kneader to adjust a viscosity of the paste to a predetermined viscosity. A configuration of activated carbon to be used in the capacitor according to the present invention will be further described later.

The paste is applied to the front and back surfaces of current collectors 2a and 3a, and dried in an air atmosphere at 100° C., and pressure is applied by a press machine to form 40 μm-thick electrode part 2b. Thereafter, current collectors 2a and 3a provided with electrode layers 2b and 3b are subjected to slit processing so as to have a predetermined width.

Further, electrode parts 2b and 3b formed on the front and back surfaces of current collectors 2a and 3a are each partially removed, and lead wires 5a and 5b are connected to parts, where electrode layers 2b and 3b are not formed, using a method such as needle caulking.

Surfaces of positive electrode 2 and negative electrode 3, which are provided, respectively, with electrode layers 2b and 3b, are made to face each other, separator 4 is interposed between positive electrode 2 and negative electrode 3, and in this state, positive electrode 2, negative electrode 3 and separator 4 are rolled to complete capacitor element 1. As separator 4, for example, cellulose-based paper having a thickness of 35 μm and a density of 0.45 g/cm³ is used. Separator 4 may be made of a fluorine-based material such as polytetrafluoroethylene.

As one example, ethyltrimethylammonium tetrafluoroborate ($ETMA^+BF_4^-$) that is a quaternary ammonium salt is used as for an electrolytic solution. An anion in a solute is preferably one including a fluorine atom in view of voltage resistance characteristics, and particularly, $BF_4^-$ or $PF_6^-$ is preferable. As a solvent, for example, γ-butyrolactone that is an organic solvent is used. The solvent is mixed in such a manner that a concentration of solute is 0.5 mol/l to 2.0 mol/l.

For outer packaging case 6, for example, a metal such as aluminum or copper is used in view of heat dissipation, but a material for outer packaging case 6 is not particularly limited as long as the material unlikely reacts with an electrolytic solution, and outer packaging case 6 may be a rectangular column case, a case of laminate type, or a resin case. A coin-type case which also serves as a current collector that is electrically connected to the electrode layer may also be used as outer packaging case 6.

Sealing member 7 is, for example, butyl rubber, but sealing member 7 is not particularly limited as long as it is an elastic rubber material. Lead wires 5a and 5b protruding from capacitor element 1 are made to pass through through-hole 7a provided in sealing member 7. In this state, sealing member 7 is provided in an opening of bottomed cylinder-shaped outer packaging case 6, drawing processing is performed toward an inside of outer packaging case 6 from an outer peripheral surface of the opening of outer packaging case 6 on which sealing member 7 is situated, and an opening end part of outer packaging case 6 is subjected to curling processing, so that sealing member 7 is compressed and tightly bonded to be fixed. Accordingly, sealing of the opening of outer packaging case 6 is completed.

In this way, the capacitor according to the present invention is completed.

The capacitor according to the present invention is characterized in that at least one of a positive electrode and a negative electrode contains activated carbon, and a sum of volumes per unit weight of pores having a pore diameter of from 30 Å to 100 Å inclusive among pores of the activated carbon, is 0.2 cm³/g or more.

Owing to the above-mentioned configuration, a capacitor of the present invention is capable of suppressing deterioration of charge-discharge characteristics in repetition of charge-discharge. This may be because an electrolytic solution impregnated into pores, and cations and anions contained in the electrolytic solution are easily diffused in the pores. Thus, even under a low temperature at which migration performance of ions are easily deteriorated, charge-discharge can be performed while certain migration performance is maintained.

For activated carbon to be used in the capacitor according to the present invention, information of a cumulative volume distribution that is measured by a Barrett-Joyner-Halenda (BJH) method can be used as a method for determining a sum of volumes of pores having a pore diameter in the above-described range as a configuration requirement. More specifically, using an automatic specific surface area analyzer TriStar 3020 (SHIMADZU CORPORATION) is used as a measurement apparatus, measurement is performed after activated carbon as a sample is evacuated to 50 mTorr at 250° C. as a pretreatment for removing impurities. In use of the BJH method, a Harkins & Jura equation is employed as a calculation formula.

In the volume distribution of pores of activated carbon to be used in the capacitor according to the present invention, each of differential pore volume $V_{30}$ (cm³/g·Å) corresponding to a pore diameter of 30 Å and differential pore volume $V_{100}$ (cm³/g·Å) corresponding to a pore diameter of 100 Å is preferably 0.5 or more. Each of the differential pore volumes is more preferably 0.6 or more. Owing to the above-mentioned configuration, deterioration of charge-discharge characteristics in repetition of charge-discharge can be suppressed. This may be because when assuming a pore formed in such a manner that an opening part is situated at a surface of an activated particle, a pore having an opening diameter above a certain level as an opening part of the pore can be provided, and the opening part improves a capability of feeding and diffusing into the pore an electrolytic solution contained in a gap between activated carbon particles. Here, for values of differential pore volumes $V_{30}$ and $V_{100}$ required for identifying the above-mentioned configuration, information of a log differential pore volume distribution dV/d(log D) is used. Basically, values corresponding to pore diameters of 30 Å and 100 Å in the volume distribution are used as $V_{30}$ and $V_{100}$, respectively, but there may be a case where in data (plot group) based on which the volume distribution is drawn, data just at 30 Å and 100 Å do not exist, and only data at values near 30 Å and near 100 Å exist. In this case, information of values closest to 30 Å and 100 Å (nearest values) in values near 30 Å and 100 Å is used. The nearest values are preferably in a range of 29 Å to 31 Å and in a range of 99 Å to 101 Å.

Preferably, activated carbon to be used in the capacitor according to the present invention has a configuration in which in the volume distributions of pores thereof, differential pore volumes at pore diameters ranging from 30 Å to 100 Å are each kept at a certain level with a small deviation. In other words, it is preferable that an approximate curve of the volume distribution has a reduced extreme level difference and slope and has certain flatness at pore diameters in the above-mentioned range.

For satisfying the above-mentioned requirement, an absolute value of a difference between differential pore volumes $V_{30}$ and $V_{100}$ in activated carbon to be used in the capacitor according to the present invention is preferably less than 0.1. An absolute value of a difference between each of all differential pore volumes $V_{in}$ at pore diameters $d_{in}$ ($\neq 30$ Å and 100 Å) ranging from 30 Å to 100 Å and at least one of differential pore volumes $V_{30}$ and $V_{100}$ is preferably less than 0.1. Owing to the above-mentioned configuration, activated carbon in the present invention is capable of further improving diffusibility of ions in pores. This may be because pores having pore diameters ranging from 30 Å to 100 Å exist without being deviated at the pore diameters, so that in the pores, the number of spots at which the pore diameter is extremely changed can be reduced, and thus diffusion of ions can be inhibited from being hindered. Here, the description "an absolute value of a difference between each of all differential pore volumes $V_{in}$ and differential pore volume $V_{30}$ or $V_{100}$ is less than 0.1" means that the absolute value of the difference is less than 0.1 at all plots of differential pore volumes which are used in the volume distribution when the pore diameter is in the above-mentioned range. The requirement for the absolute value of the difference should be satisfied by at least one of the difference between differential pore volumes $V_{in}$ and differential pore volume $V_{30}$ and the difference between differential pore volumes $V_{in}$ and differential pore volume $V_{100}$. For differential pore volume $V_{in}$, information of the log differential pore volume distribution is used as in the case of differential pore volumes $V_{30}$ and $V_{100}$.

Further, it is preferable that in the volume distribution of activated carbon to be used in the capacitor according to the present invention, a maximum peak in activated carbon is provided at a pore diameter of more than 1 Å and less than 20 Å. Owing to the above-mentioned configuration, the activated carbon can be sufficiently provided with pores that considerably contribute to exhibition of an electrostatic capacity. An energy density can be improved as a capacitor. Here, the maximum peak means a peak, in which the differential volume at a top of the peak is the largest among one or more peaks, in the differential volume distribution of activated carbon versus the pore diameter. For ensuring that the top of the maximum peak is provided (or "situated") at a pore diameter of more than 1 Å and less than 20 Å, it is required that at least the top of the maximum peak be in the above-mentioned pore diameter range. Thus, this does not mean that a whole of a curve forming the maximum peak is in the above-mentioned pore diameter range. The top of the maximum peak means a curve part being a maximum point, or a plot thereof, in the curve (more specifically, an approximate curve derived from a set of plots) forming the maximum peak.

(Performance Evaluation Test)

Results of a test of performance comparison conducted for the capacitor according to the present invention will be shown below.

In this test, performance evaluation was performed for a plurality of capacitors having the same configuration except that the capacitors have different pore volume distribution states of activated carbon used. Among capacitors of samples A to G for which performance evaluation was performed in this test, samples A to D correspond to the capacitor of the present invention, and capacitors of samples E to G correspond to capacitors of comparative examples.

Configurations of activated carbon used in capacitors of samples A to G are shown in Table 1. Table 1 shows the sum of volumes of pores having a pore diameter of 30 Å to 100 Å, differential pore volumes $V_{30}$ and $V_{100}$, the absolute value of a difference ($|V_{30}-V_{100}|$) between differential pore volumes $V_{30}$ and $V_{100}$, and the maximum absolute value of a difference ($|V_{in}-(V_{30}$ or $V_{100})|$) between differential pore volume $V_{in}$ and differential pore volume $V_{30}$ or $V_{100}$. For the absolute value of a difference $|V_{in}-(V_{30}$ or $V_{100})|$, the smaller of the two absolute values of differences between differential pore volume $V_{in}$, and each of differential pore volumes $V_{30}$ and $V_{100}$ is defined as a difference between differential pore volume $V_{in}$ and differential pore volume $V_{30}$ or $V_{100}$, and the largest value in a set of the differences is used. This largest value is an index of a degree of deviation of the volume distribution in the above-mentioned pore diameter range.

TABLE 1

| | Sum of volumes (30 Å to 100 Å) cm³/g | $V_{30}$ cm³/ g · Å | $V_{100}$ cm³/ g · Å | $\lvert V_{30} - V_{100} \rvert$ cm³/g · Å | $\lvert V_{in} - (V_{30}$ or $V_{100}) \rvert$ cm³/g · Å |
|---|---|---|---|---|---|
| Sample A | 0.412 | 0.859 | 0.826 | 0.033 | 0.068 |
| Sample B | 0.350 | 0.687 | 0.667 | 0.020 | 0.065 |
| Sample C | 0.294 | 1.311 | 0.369 | 0.942 | 0.456 |
| Sample D | 0.202 | 0.717 | 0.208 | 0.529 | 0.283 |
| Sample E | 0.187 | 0.767 | 0.092 | 0.675 | 0.335 |
| Sample F | 0.121 | 0.349 | 0.144 | 0.205 | 0.099 |
| Sample G | 0.044 | 0.195 | 0.039 | 0.156 | 0.073 |

Table 2 shows results of evaluation of characteristics of capacitors of samples A to G produced using activated carbon having the above-mentioned configurations. In this test, characteristic values of a capacitor are measured with the capacitor charged at a constant current of 100 mA to 2.7 V, held at 2.7 V for 7 minutes, and then discharged at a constant current of 20 mA under an atmosphere at $-30°$ C. so that a characteristic tendency of each activated carbon is evident. A loading test is conducted for the capacitor of each sample, and a ratio of values of direct current resistance (DCR) and a ratio of capacity values before and after the loading test is performed are shown as a DCR change ratio for a cell alone, a DCR change ratio for activated carbon alone, and a capacity retention ratio in Table 2. The loading test was conducted for 1300 hours with a voltage of 2.7 V applied to the capacitor under an atmosphere at 70° C.

TABLE 2

| | DCR change ratio (cell) $-30°$ C. 1300 h % | DCR change ratio (activated carbon) $-30°$ C. 1300 h % | Capacity retention ratio $-30°$ C. 1300 h % |
|---|---|---|---|
| Sample A | 148 | 283 | 70.9 |
| Sample B | 162 | 300 | 68.8 |
| Sample C | 285 | 1990 | 58.5 |
| Sample D | 310 | 2263 | 53.8 |
| Sample E | 331 | 3552 | 35.2 |
| Sample F | 365 | 5469 | 25.6 |
| Sample G | 4000 | 9286 | 2.14 |

Methods for measuring characteristic values based on the above-mentioned charge-discharge conditions are as follows. A capacity C of the capacitor at each time point is calculated from the following equation (1) using a time $t_{80-40}$ taken for a voltage to decrease from 80% (=2.16 V) to 40% (=1.08 V) of a full-charge voltage, a voltage difference $V_{80-40}$ (1.08) therebetween, and a current value $I_d$ (=20 mA) in discharge.

$$C = I_d \times t_{80-40}/V_{80-40} \quad (1)$$

For a resistance of the capacitor at each time point, a primary approximate line is calculated after discharge from a charge curve at 0.5 seconds to 2 seconds with a discharge start time point set to 0 second, and a capacitor resistance DCR (cell) of the whole cell is calculated from the following equation (2) using a difference dV between a potential as an intercept of the line and a potential of the capacitor immediately before discharge, and the current value $I_d$ in discharge.

$$DCR\ (cell) = dV/I_d \quad (2)$$

For a resistance of activated carbon at each time point, an electronic resistance r (sum of welding resistances of a current collecting foil and a lead wire) other than that of activated carbon is subtracted from DCR (cell), and a resistivity of activated carbon is calculated from the following formula (3) using an electrode cross-section S and an electrode thickness d.

$$DCR\ (activated\ carbon) = (DCR\ (cell) - r) \times S/d \quad (3)$$

From Table 2, it is apparent that samples A to D as the capacitor of the present invention in which the sum of volumes is 0.2 cm³/g or more are superior in DCR change ratios for the capacitor alone and activated carbon alone and capacity retention ratio to samples E to G in which the sum of volumes is less than 0.2 cm³/g. From Table 2, it is apparent that among samples A to D, samples A and B have a further improved DCR change ratio for activated carbon alone, in particular, as compared to samples C and D. This is because as shown in Table 1, in activated carbon used in the capacitors of samples A and B, a difference between differential pore volumes $V_{30}$ and $V_{100}$ is much smaller as compared to activated carbon used in the capacitors of samples C and D, and differential pore volumes $V_{in}$ at pore diameters ranging from 30 Å to 100 Å are each kept at a certain level, and have a small deviation.

Figure 2:
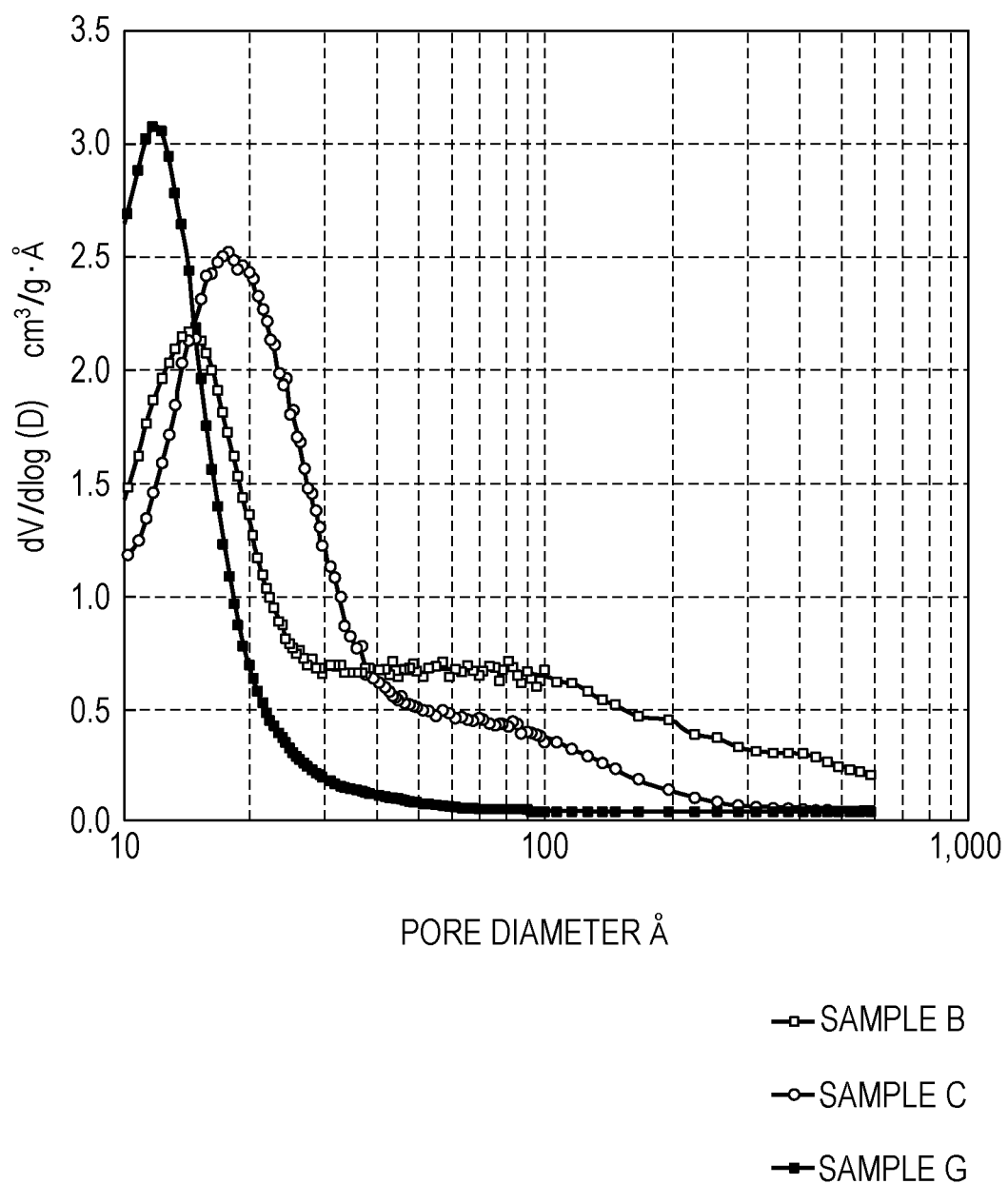
FIG. 2 is a pore volume distribution diagram for activated carbon to be used in the capacitor according to the exemplary embodiment of the present invention and activated carbon to be used in a capacitor of a comparative example.

FIG. 2 is a view showing pore volume distributions of activated carbon used in the capacitors of samples B, C and G among samples A to G used in the test.

From FIG. 2, it is apparent in view of the differential pore volume that activated carbon in the capacitors of samples B and C which correspond to the capacitor of the present invention has a larger volume of pores having a pore diameter of 30 Å to 100 Å as compared to activated carbon of sample G which corresponds to the capacitor of the comparative example. Further, it is apparent that in activated carbon in the capacitor of sample B, pores having a pore diameter of from 30 Å to 100 Å inclusive have a smaller deviation in volume at each pore diameter as compared to activated carbon in the capacitor of sample C, and the pores with a pore diameter in this range each have a volume above a certain level. Particularly, activated carbon like one used in the capacitor of sample B is often used as activated carbon that has been heretofore used in products other than power storage devices (moisture absorbents, catalysts, medical products and so on).

INDUSTRIAL APPLICABILITY

A capacitor according to the present invention has excellent performance in reliability of charge-discharge characteristics. The capacitor according to the present invention is expected to be used as a power storage device for an electronic device which is used in a variety of environments and required to have high reliability.

REFERENCE MARKS IN THE DRAWINGS

1: capacitor element
2: positive electrode
2a, 3a: current collector
2b, 3b: electrode layer
3: negative electrode
4: separator
5a, 5b: lead wire
6: outer packaging case
7: sealing member
7a: through-hole

The invention claimed is:

1. A capacitor comprising a capacitor element including a positive electrode and a negative electrode, wherein
   at least one of the positive electrode and the negative electrode contains activated carbon,
   a sum of volumes per unit weight of pores having a pore diameter of from 30 Å to 100 Å inclusive among pores of the activated carbon is 0.2 cm³/g or more,
   in a volume distribution of the pores of the activated carbon, a top of a maximum peak in the volume distribution is situated at a position corresponding to a pore diameter of more than 1 Å and less than 20 Å, and
   an absolute value of an average slope of the volume distribution of the pores of the activated carbon versus the logarithmic pore diameter at pore diameters ranging from 40 Å to 100 Å is less than an absolute value of an average slope of the volume distribution of the pores of the activated carbon versus the pore diameter at pore diameters ranging from 100 Å to 300 Å.

2. The capacitor according to claim 1, wherein
   in a volume distribution of the pores of the activated carbon,
   a differential pore volume $V_{30}$ (cm³/g·Å) of a pore having a pore diameter of 30 Å is 0.5 or more, and
   a differential pore volume $V_{100}$ (cm³/g·Å) of a pore having a pore diameter of 100 Å is 0.5 or more.

3. The capacitor according to claim 1, wherein
   in a volume distribution of the pores of the activated carbon,
   an absolute value of a difference between a differential pore volume $V_{30}$ (cm³/g·Å) of a pore having a pore diameter of 30 Å and a differential pore volume $V_{100}$ (cm³/g·Å) of a pore having a pore diameter of 100 Å is less than 0.1.

4. The capacitor according to claim 3, wherein
   an absolute value of a difference between each of differential pore volumes $V_{in}$ (cm³/g·Å) having a pore diameter of more than 30 Å and less than 100 Å among pores of the activated carbon and at least one of the differential pore volumes $V_{30}$ and $V_{100}$ is less than 0.1.

5. A capacitor comprising a capacitor element including a positive electrode and a negative electrode, wherein:
   at least one of the positive electrode and the negative electrode contains activated carbon,
   a sum of volumes per unit weight of pores having a pore diameter of from 30 Å to 100 Å inclusive among pores of the activated carbon is 0.2 cm³/g or more,
   an absolute value of a difference between a differential pore volume $V_{30}$ (cm³/g·Å) of a pore having a pore diameter of 30 Å and a differential pore volume $V_{100}$ (cm³/g·Å) of a pore having a pore diameter of 100 Å is less than 0.1, and in a volume distribution of the pores of the activated carbon, a top of a maximum peak in the volume distribution is situated at a position corresponding to a pore diameter of more than 1 Å and less than 20 Å.

6. The capacitor according to claim 5, wherein in a volume distribution of the pores of the activated carbon, a differential pore volume $V_{30}$ (cm³/g·Å) of a pore having a pore diameter of 30 Å is 0.5 or more, and a differential pore volume $V_{100}$ (cm³/g·Å) of a pore having a pore diameter of 100 Å is 0.5 or more.

7. The capacitor according to claim 5, wherein an absolute value of a difference between a differential pore volume $V_{40}$ (cm³/g·Å) of a pore having a pore diameter of 40 Å and a differential pore volume $V_{100}$ (cm³/g·Å) of a pore having a pore diameter of 100 Å is less than an absolute value of a difference between a differential pore volume $V_{100}$ (cm³/g·Å) of a pore having a pore diameter of 100 Å and a differential pore volume $V_{300}$ (cm³/g·Å) of a pore having a pore diameter of 300 Å.

8. The capacitor according to claim 6, wherein an absolute value of a difference between a differential pore volume $V_{40}$ (cm³/g·Å) of a pore having a pore diameter of 40 Å and a differential pore volume $V_{100}$ (cm³/g·Å) of a pore having a pore diameter of 100 Å is less than an absolute value of a difference between a differential pore volume $V_{100}$ (cm³/g·Å) of a pore having a pore diameter of 100 Å and a differential pore volume $V_{300}$ (cm³/g·Å) of a pore having a pore diameter of 300 Å.

9. A capacitor comprising a capacitor element including a positive electrode and a negative electrode, wherein at least one of the positive electrode and the negative electrode contains activated carbon, a sum of volumes per unit weight of pores having a pore diameter of from 30 Å to 100 Å inclusive among pores of the activated carbon is 0.2 cm³/g or more, and in a volume distribution of the pores of the activated carbon, a top of a maximum peak in the volume distribution is situated at a position corresponding to a pore diameter of more than 1 Å and less than 20 Å.

10. The capacitor according to claim 9, wherein in a volume distribution of the pores of the activated carbon, a differential pore volume $V_{30}$ (cm³/g·Å) of a pore having a pore diameter of 30 Å is 0.5 or more, and a differential pore volume $V_{100}$ (cm³/g·Å) of a pore having a pore diameter of 100 Å is 0.5 or more.

11. The capacitor according to claim 9, wherein an absolute value of a difference between a differential pore volume $V_{40}$ (cm³/g·Å) of a pore having a pore diameter of 40 Å and a differential pore volume $V_{100}$ (cm³/g·Å) of a pore having a pore diameter of 100 Å is less than an absolute value of a difference between a differential pore volume $V_{100}$ (cm³/g·Å) of a pore having a pore diameter of 100 Å and a differential pore volume $V_{300}$ (cm³/g·Å) of a pore having a pore diameter of 300 Å.

\* \* \* \* \*